April 14, 1925. 1,533,937
S. MÓGOR
REFLECTING DEVICE FOR AUTOMOBILES
Filed Oct. 16, 1923 2 Sheets-Sheet 1

Sándor Mógor
INVENTOR

BY *Victor J. Evans*
ATTORNEY

WITNESSES

April 14, 1925.  1,533,937
S. MÓGOR
REFLECTING DEVICE FOR AUTOMOBILES
Filed Oct. 16, 1923   2 Sheets-Sheet 2
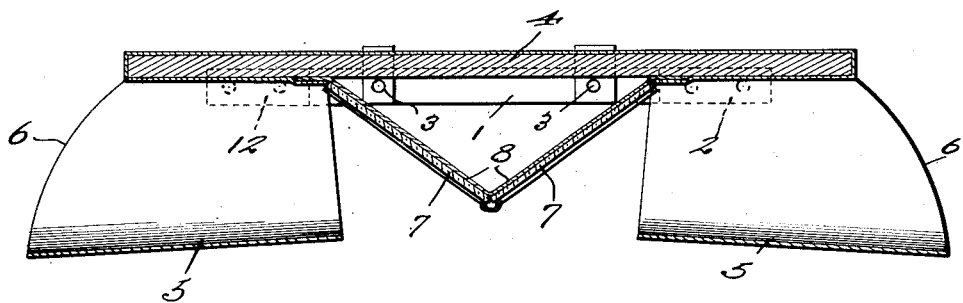
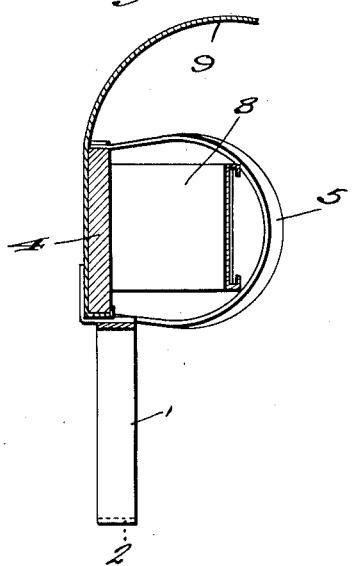
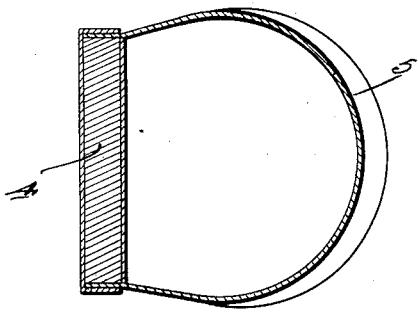
Sándor Mógor
INVENTOR Patented Apr. 14, 1925.

1,533,937

UNITED STATES PATENT OFFICE.

SÁNDOR MÓGOR, OF WEST DETROIT, MICHIGAN.

REFLECTING DEVICE FOR AUTOMOBILES.

Application filed October 16, 1923. Serial No. 668,919.

*To all whom it may concern:*

Be it known that I, SÁNDOR MÓGOR, a citizen of the Republic of Hungary, residing at West Detroit, in the county of Wayne and State of Michigan, have invented new and useful Improvements in Reflecting Devices for Automobiles, of which the following is a specification.

The object of my said invention is the provision of an inexpensive and compact device adapted when properly positioned on an automobile in front of the driver, to enable the driver to see objects at opposite sides of the course of the automobile without the necessity of the driver turning his head.

To the attainment of the foregoing, the invention consists in the improvement as hereinafter described and definitely claimed.

In the accompanying drawings, forming part of this specification:—

Figure 3 is a horizontal section taken in the plane indicated by the line 3—3 of Figure 1.

Figure 4 is a vertical central section taken in the plane indicated by the line 4—4 of Figure 1.

Figure 5 is a vertical section taken in the plane indicated by the line 5—5 of Figure 1 and showing one of the lateral tubes comprised in the device.

Similar numerals of reference designate corresponding parts in all of the views of the drawings.

Figure 1:
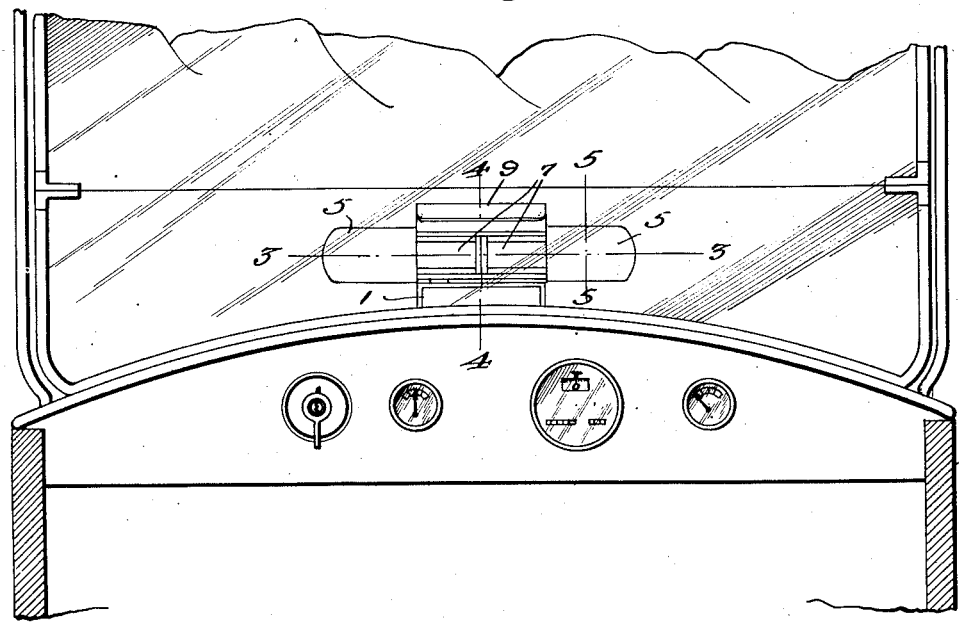
Figure 1 is a rear elevation showing my novel device as properly positioned on an automobile.
Figure 2:
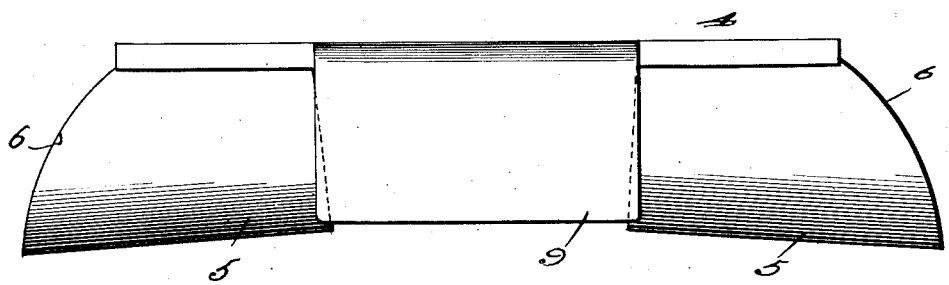
Figure 2 is a top plan view of the device.

Among other elements my novel reflecting device comprises a base 1 adapted to be superimposed upon and attached to an appropriate part of an automobile. On the said base 1 and fixed with respect thereto are angular brackets 2, and to the upright portions of the said brackets 2 is fixed at 3 the body bar 4 of my novel device which bar 4 is designed to be arranged crosswise of the automobile as shown.

In addition to the body bar 4 my novel device comprises two lateral tubes 5 extending horizontally and crosswise of the automobile and spaced apart and also spaced from the vertical center of the device. The body bar 4 is preferably, though not necessarily, formed of wood, and the tubes 5 are formed in part, by preference, of sheet metal, it being understood in this connection that the forward side of each tube is formed by the body bar 4 which contributes to the inexpensiveness of the device. The outer end of each tube is beveled or inclined forwardly and inwardly as indicated by 6 for the better observation through the tubes of objects reflected in the mirrors 7.

Carried by the body bar 4 and disposed at the rear side thereof and between the inner ends of the tubes 5 are mirrors 7 which are mounted in a frame 8 and are arranged at obtuse angles to each other. The frame 8 is appropriately fixed to the body bar 4 and is formed by preference of sheet metal.

Fixed to the body bar 4 and overhanging the mirrors 7 and the inner opposed ends of the tubes 5 is a canopy 9. This canopy 9 is preferably of sheet metal and curvilinear in form and it serves to shade and to subdue the light adjacent to the mirrors 7 so as to promote the clearness of the reflections visible in the mirrors 7.

In the practical use of my novel device it will be manifest that by glancing into the mirrors 7 and without turning his head to either side, the driver of an automobile is enabled by virtue of the relation of the tubes 5 to the mirror to clearly perceive objects at opposite sides of the course of the automobile.

Notwithstanding the practical advantages possessed by my novel device it will be manifest that the same is at once simple and inexpensive in construction as well as compact, and that the device is calculated to enhance rather than detract from the finished appearance of the automobile to which it is applied.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A reflecting device for automobiles comprising a body bar, tubes carried by the body bar and formed in part by the same and spaced apart lengthwise of the body bar, a mirror frame carried by the body bar at one side thereof and arranged between the inner opposed ends of the said tubes, mirrors carried by said frame and arranged between the inner opposed ends of the tubes and disposed at obtuse angles to each other, and a canopy carried by the body bar and overhanging the mirror frame and mirrors and the inner ends of the said tubes.

2. A reflecting device for automobiles comprising a body bar, tubes carried by the body bar and formed in part by the same and spaced apart lengthwise of the body bar, a mirror frame carried by the body bar at one side thereof and arranged between the inner opposed ends of the said tubes, mirrors carried by said frame and arranged between the inner opposed ends of the tubes and disposed at obtuse angles to each other, and a canopy carried by the body bar and overhanging the mirror frame and mirrors and the inner ends of the said tubes; the said tubes being provided with inclined outer ends.

3. A reflecting device for automobiles comprising tubes spaced apart and adapted to be arranged crosswise of an automobile, reflecting means bulged rearwardly and located between the inner opposed ends of the tubes, and a canopy overhanging the said reflecting means and supported in front of the reflecting means.

4. A reflecting device for automobiles comprising a tube adapted to be arranged crosswise of an automobile, reflecting means arranged opposite the inner end of the tube and at an angle to the length of the tube, and a canopy overhanging the said reflecting means and supported in front of the same.

In testimony whereof I affix my signature.

SÁNDOR MÓGOR.